US012657845B2

(12) United States Patent
Xiong

(10) Patent No.: US 12,657,845 B2
(45) Date of Patent: Jun. 16, 2026

(54) EFFICIENT DEPTH-BASED VIEWPOINT MATCHING AND HEAD POSE CHANGE COMPENSATION FOR VIDEO SEE-THROUGH (VST) EXTENDED REALITY (XR)

(71) Applicant: Samsung Electronics Co., Ltd., Suwon-si (KR)

(72) Inventor: Yingen Xiong, Mountain View, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 96 days.

(21) Appl. No.: 18/639,261

(22) Filed: Apr. 18, 2024

(65) Prior Publication Data

US 2024/0378820 A1     Nov. 14, 2024

Related U.S. Application Data

(60) Provisional application No. 63/465,208, filed on May 9, 2023.

(51) Int. Cl.
*G06T 19/00* (2011.01)
*G06F 3/01* (2006.01)
(Continued)

(52) U.S. Cl.
CPC ............ *G06T 19/006* (2013.01); *G06F 3/011* (2013.01); *G06F 3/012* (2013.01); *G06T 5/80* (2024.01);
(Continued)

(58) Field of Classification Search
None
See application file for complete search history.

(56) References Cited

U.S. PATENT DOCUMENTS 10,778,950 B2  9/2020  Park
11,113,891 B2  9/2021  Noris et al.
(Continued)

FOREIGN PATENT DOCUMENTS

JP     6332658 B1     5/2018
JP     6975309 B2    12/2021
(Continued)

OTHER PUBLICATIONS

Ishihara et al., "Integrating Both Parallax and Latency Compensation into Video See-through Head-mounted Display", IEEE Transactions on Visualization and Computer Graphics, vol. 29, No. 5, May 2023, 11 pages.
(Continued)

*Primary Examiner* — Jwalant Amin

(57) ABSTRACT

A video see-through (VST) extended reality (XR) device includes a see-through camera configured to capture an image frame of a three-dimensional (3D) scene, a display panel, and at least one processing device. The at least one processing device is configured to obtain the image frame, identify a depth-based transformation in 3D space, transform the image frame into a transformed image frame based on the depth-based transformation, and initiate presentation of the transformed image frame on the display panel. The depth-based transformation provides (i) viewpoint matching between a head pose of the VST XR device when the image frame is captured and a head pose of the VST XR device when the transformed image frame is presented, (ii) parallax correction between the head poses, and (iii) compensation for a change between the head poses.

20 Claims, 8 Drawing Sheets

(51) Int. Cl.
*G06T 5/80* (2024.01)
*H04N 13/117* (2018.01)
*H04N 13/128* (2018.01)

(52) U.S. Cl.
CPC ......... *H04N 13/117* (2018.05); *H04N 13/128* (2018.05)

(56) References Cited

U.S. PATENT DOCUMENTS

| | | | |
|---|---|---|---|
| 11,361,455 B2 | 6/2022 | Bleyer et al. | |
| 11,372,243 B2 | 6/2022 | Shmunk | |
| 11,450,014 B2 | 9/2022 | Bleyer et al. | |
| 11,611,735 B2 | 3/2023 | Hegyi | |
| 11,656,679 B2 | 5/2023 | Thaut et al. | |
| 11,790,482 B2 | 10/2023 | Nourai et al. | |
| 2018/0061121 A1* | 3/2018 | Yeoh | G06T 15/005 |
| 2019/0258058 A1* | 8/2019 | Fortin-Deschênes | G02B 27/017 |
| 2020/0051342 A1 | 2/2020 | Bates | |
| 2020/0098163 A1* | 3/2020 | Freeman | G02B 30/56 |
| 2022/0335637 A1* | 10/2022 | Price | G06T 7/593 |
| 2023/0237741 A1 | 7/2023 | Park et al. | |

FOREIGN PATENT DOCUMENTS

| | | |
|---|---|---|
| KR | 102166158 B1 | 10/2020 |
| WO | 2016040153 A1 | 3/2016 |

OTHER PUBLICATIONS

International Search Report and Written Opinion of the International Searching Authority dated Aug. 23, 2024 in connection with International Patent Application No. PCT/KR2024/006174, 10 pages.

* cited by examiner

EFFICIENT DEPTH-BASED VIEWPOINT MATCHING AND HEAD POSE CHANGE COMPENSATION FOR VIDEO SEE-THROUGH (VST) EXTENDED REALITY (XR)

CROSS-REFERENCE TO RELATED APPLICATIONS AND PRIORITY CLAIM

This application claims priority under 35 U.S.C. § 119(e) to U.S. Provisional Patent Application No. 63/465,208 filed on May 9, 2023. This provisional patent application is hereby incorporated by reference in its entirety.

TECHNICAL FIELD

This disclosure relates generally to extended reality (XR) systems and processes. More specifically, this disclosure relates to efficient depth-based viewpoint matching and head pose change compensation for video see-through (VST) XR.

BACKGROUND

Extended reality (XR) systems are becoming more and more popular over time, and numerous applications have been and are being developed for XR systems. Some XR systems (such as augmented reality or "AR" systems and mixed reality or "MR" systems) can enhance a user's view of his or her current environment by overlaying digital content (such as information or virtual objects) over the user's view of the current environment. For example, some XR systems can often seamlessly blend virtual objects generated by computer graphics with real-world scenes.

SUMMARY

This disclosure relates to efficient depth-based viewpoint matching and head pose change compensation for video see-through (VST) extended reality (XR).

In a first embodiment, a method includes obtaining, using at least one processing device of a VST XR device, an image frame of a three-dimensional (3D) scene captured using a see-through camera of the VST XR device. The method also includes identifying, using the at least one processing device, a depth-based transformation in 3D space. The method further includes transforming, using the at least one processing device, the image frame into a transformed image frame based on the depth-based transformation. In addition, the method includes initiating, using the at least one processing device, presentation of the transformed image frame on a display panel of the VST XR device. The depth-based transformation provides (i) viewpoint matching between a head pose of the VST XR device when the image frame is captured and a head pose of the VST XR device when the transformed image frame is presented, (ii) parallax correction between the head poses, and (iii) compensation for a change between the head poses.

In a second embodiment, a VST XR device includes a see-through camera configured to capture an image frame of a 3D scene, a display panel, and at least one processing device. The at least one processing device is configured to obtain the image frame, identify a depth-based transformation in 3D space, transform the image frame into a transformed image frame based on the depth-based transformation, and initiate presentation of the transformed image frame on the display panel. The depth-based transformation provides (i) viewpoint matching between a head pose of the VST XR device when the image frame is captured and a head pose of the VST XR device when the transformed image frame is presented, (ii) parallax correction between the head poses, and (iii) compensation for a change between the head poses.

In a third embodiment, a non-transitory machine readable medium contains instructions that when executed cause at least one processor of a VST XR device to obtain an image frame of a 3D scene captured using a see-through camera of the VST XR device. The non-transitory machine readable medium also contains instructions that when executed cause the at least one processor to identify a depth-based transformation in 3D space, transform the image frame into a transformed image frame based on the depth-based transformation, and initiate presentation of the transformed image frame on a display panel of the VST XR device. The depth-based transformation provides (i) viewpoint matching between a head pose of the VST XR device when the image frame is captured and a head pose of the VST XR device when the transformed image frame is presented, (ii) parallax correction between the head poses, and (iii) compensation for a change between the head poses.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B,"

"at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic accessory, an electronic tattoo, a smart mirror, or a smart watch).

Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a dryer, an air cleaner, a set-top box, a home automation control panel, a security control panel, a TV box (such as SAMSUNG HOMESYNC, APPLETV, or GOOGLE TV), a smart speaker or speaker with an integrated digital assistant (such as SAMSUNG GALAXY HOME, APPLE HOME-POD, or AMAZON ECHO), a gaming console (such as an XBOX, PLAYSTATION, or NINTENDO), an electronic dictionary, an electronic key, a camcorder, or an electronic picture frame. Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to various embodiments of this disclosure, an electronic device may be one or a combination of the above-listed devices. According to some embodiments of this disclosure, the electronic device may be a flexible electronic device. The electronic device disclosed here is not limited to the above-listed devices and may include any other electronic devices now known or later developed.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding of this disclosure and its advantages, reference is now made to the following description taken in conjunction with the accompanying drawings, in which.

DETAILED DESCRIPTION

Figure 1:
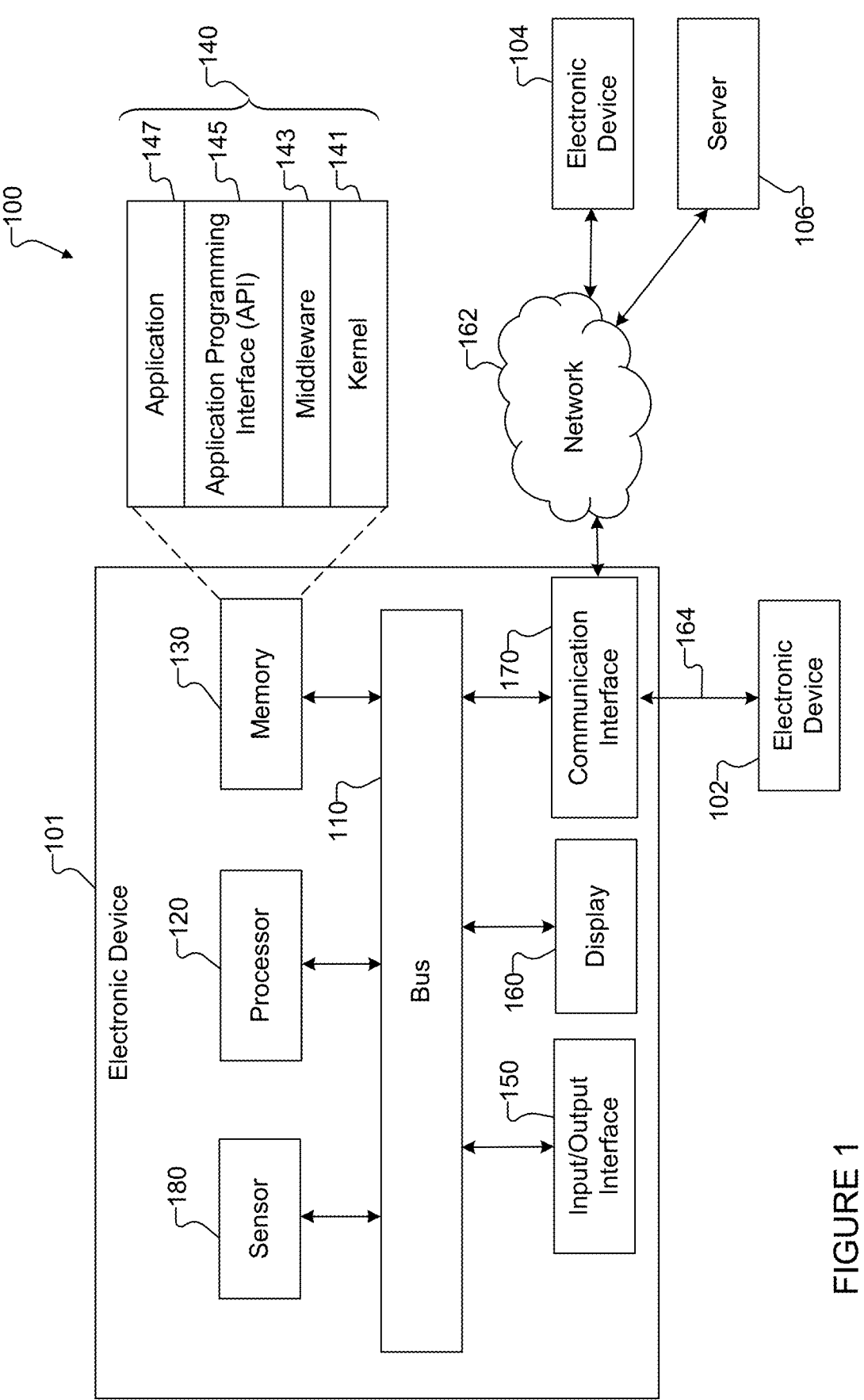
FIG. 1 illustrates an example network configuration including an electronic device in accordance with this disclosure.

FIGS. 1 through 8, discussed below, and the various embodiments of this disclosure are described with reference to the accompanying drawings. However, it should be appreciated that this disclosure is not limited to these embodiments, and all changes and/or equivalents or replacements thereto also belong to the scope of this disclosure. The same or similar reference denotations may be used to refer to the same or similar elements throughout the specification and the drawings.

As noted above, extended reality (XR) systems are becoming more and more popular over time, and numerous applications have been and are being developed for XR systems. Some XR systems (such as augmented reality or "AR" systems and mixed reality or "MR" systems) can enhance a user's view of his or her current environment by overlaying digital content (such as information or virtual objects) over the user's view of the current environment. For example, some XR systems can often seamlessly blend virtual objects generated by computer graphics with real-world scenes.

Optical see-through (OST) XR systems refer to XR systems in which users directly view real-world scenes through head-mounted devices (HMDs). Unfortunately, OST XR systems face many challenges that can limit their adoption. Some of these challenges include limited fields of view, limited usage spaces (such as indoor-only usage), failure to display fully-opaque black objects, and usage of complicated optical pipelines that may require projectors, waveguides, and other optical elements. In contrast to OST XR systems, video see-through (VST) XR systems (also called "passthrough" XR systems) present users with generated video sequences of real-world scenes. VST XR systems can be built using virtual reality (VR) technologies and can have various advantages over OST XR systems. For example, VST XR systems can provide wider fields of view and can provide improved contextual augmented reality.

A VST XR device often includes left and right see-through cameras that are used to capture see-through image frames of a scene around the VST XR device, and the image frames are modified and presented on one or more display panels to left and right eyes of a user. Because the see-through cameras are located at positions other than at the eyes of the user, the see-through image frames are typically reprojected to left and right virtual image frames associated with left and right virtual cameras, which represent the left and right eyes of the user. However, VST XR devices are typically mobile, and a user using a VST XR device is generally able to move and view scenes from different viewpoints. This movement results in a change in the head pose of the user.

A VST XR device typically needs to perform multiple operations in order to convert see-through image frames into virtual image frames, such as viewpoint matching, parallax correction, and head pose change compensation. Prior approaches generally use multiple transformations to reproject image frames from see-through camera viewpoints to eye viewpoints in order to provide final views to the user. Since each transformation is in three-dimensional (3D) space, this can result in slow and inefficient operation of the VST XR device, which can negatively impact user experiences. For instance, these issues can result in greater usage of processing resources and other computational resources in the VST XR device and greater latency (slower operating speed). These issues can also limit the frame rate of image frames provided to the user of the VST XR device, which may result in choppy or other undesirable effects.

This disclosure provides various techniques supporting efficient depth-based viewpoint matching and head pose change compensation for VST XR. As described in more detail below, an image frame of a 3D scene captured using a see-through camera of the VST XR device can be obtained. A depth-based transformation in 3D space can be identified, and the image frame can be transformed into a transformed image frame based on the depth-based transformation. The transformed image frame can be presented on a display panel of the VST XR device. The depth-based transformation can provide (i) viewpoint matching between a head pose of the VST XR device when the image frame is captured and a head pose of the VST XR device when the transformed image frame is presented, (ii) parallax correction between the head poses, and (iii) compensation for a change between the head poses. Thus, for instance, a single transformation may be used to convert the image frame at an image plane associated with the see-through camera directly into the transformed image frame at an image plane associated with an eye of a user of the VST XR device. In some cases, the depth-based transformation may be applied selectively, such as when it is determined that the change between the head poses involves only translation of the VST XR device or both translation and rotation of the VST XR device. Planar reprojection may be used when the change between the head poses includes only rotation of the VST XR device, and no transformation may be needed when there is no change in the head pose of the VST XR device. This process can be performed for image frames captured using different see-through cameras (such as left and right see-through cameras) to generate transformed image frames that are presented on one or more display panels (such as left and right display panels). This can also be repeated for any number of captured image frames.

In this way, the disclosed techniques can improve the operation of a VST XR device, such as by supporting more efficient depth-based reprojections used to perform viewpoint matching, parallax correction, and head pose change compensation while converting see-through image frames into virtual image frames. This improved efficiency can result in decreased usage of processing resources and other computational resources and reduced latency. This improved efficiency can also result in improved frame rates and improved presentation of rendered image frames to a user, which can increase user satisfaction.

FIG. 1 illustrates an example network configuration 100 including an electronic device in accordance with this disclosure. The embodiment of the network configuration 100 shown in FIG. 1 is for illustration only. Other embodiments of the network configuration 100 could be used without departing from the scope of this disclosure.

According to embodiments of this disclosure, an electronic device 101 is included in the network configuration 100. The electronic device 101 can include at least one of a bus 110, a processor 120, a memory 130, an input/output (I/O) interface 150, a display 160, a communication interface 170, and a sensor 180. In some embodiments, the electronic device 101 may exclude at least one of these components or may add at least one other component. The bus 110 includes a circuit for connecting the components 120-180 with one another and for transferring communications (such as control messages and/or data) between the components.

The processor 120 includes one or more processing devices, such as one or more microprocessors, microcontrollers, digital signal processors (DSPs), application specific integrated circuits (ASICs), or field programmable gate arrays (FPGAs). In some embodiments, the processor 120 includes one or more of a central processing unit (CPU), an application processor (AP), a communication processor (CP), a graphics processor unit (GPU), or a neural processing unit (NPU). The processor 120 is able to perform control on at least one of the other components of the electronic device 101 and/or perform an operation or data processing relating to communication or other functions. As described below, the processor 120 may perform one or more functions related to efficient depth-based viewpoint matching and head pose change compensation for VST XR.

The memory 130 can include a volatile and/or non-volatile memory. For example, the memory 130 can store commands or data related to at least one other component of the electronic device 101. According to embodiments of this disclosure, the memory 130 can store software and/or a program 140. The program 140 includes, for example, a kernel 141, middleware 143, an application programming interface (API) 145, and/or an application program (or "application") 147. At least a portion of the kernel 141, middleware 143, or API 145 may be denoted an operating system (OS).

The kernel 141 can control or manage system resources (such as the bus 110, processor 120, or memory 130) used to perform operations or functions implemented in other programs (such as the middleware 143, API 145, or application 147). The kernel 141 provides an interface that allows the middleware 143, the API 145, or the application 147 to access the individual components of the electronic device

101 to control or manage the system resources. The application 147 may include one or more applications that, among other things, perform efficient depth-based viewpoint matching and head pose change compensation for VST XR. These functions can be performed by a single application or by multiple applications that each carries out one or more of these functions. The middleware 143 can function as a relay to allow the API 145 or the application 147 to communicate data with the kernel 141, for instance. A plurality of applications 147 can be provided. The middleware 143 is able to control work requests received from the applications 147, such as by allocating the priority of using the system resources of the electronic device 101 (like the bus 110, the processor 120, or the memory 130) to at least one of the plurality of applications 147. The API 145 is an interface allowing the application 147 to control functions provided from the kernel 141 or the middleware 143. For example, the API 145 includes at least one interface or function (such as a command) for filing control, window control, image processing, or text control.

The I/O interface 150 serves as an interface that can, for example, transfer commands or data input from a user or other external devices to other component(s) of the electronic device 101. The I/O interface 150 can also output commands or data received from other component(s) of the electronic device 101 to the user or the other external device.

The display 160 includes, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display. The display 160 can also be a depth-aware display, such as a multi-focal display. The display 160 is able to display, for example, various contents (such as text, images, videos, icons, or symbols) to the user. The display 160 can include a touchscreen and may receive, for example, a touch, gesture, proximity, or hovering input using an electronic pen or a body portion of the user.

The communication interface 170, for example, is able to set up communication between the electronic device 101 and an external electronic device (such as a first electronic device 102, a second electronic device 104, or a server 106). For example, the communication interface 170 can be connected with a network 162 or 164 through wireless or wired communication to communicate with the external electronic device. The communication interface 170 can be a wired or wireless transceiver or any other component for transmitting and receiving signals.

The wireless communication is able to use at least one of, for example, WiFi, long term evolution (LTE), long term evolution-advanced (LTE-A), 5th generation wireless system (5G), millimeter-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a communication protocol. The wired connection can include, for example, at least one of a universal serial bus (USB), high definition multimedia interface (HDMI), recommended standard 232 (RS-232), or plain old telephone service (POTS). The network 162 or 164 includes at least one communication network, such as a computer network (like a local area network (LAN) or wide area network (WAN)), Internet, or a telephone network.

The electronic device 101 further includes one or more sensors 180 that can meter a physical quantity or detect an activation state of the electronic device 101 and convert metered or detected information into an electrical signal. For example, the sensor(s) 180 can include cameras or other imaging sensors, which may be used to capture image frames of scenes. The sensor(s) 180 can also include one or more buttons for touch input, one or more microphones, a depth sensor, a gesture sensor, a gyroscope or gyro sensor, an air pressure sensor, a magnetic sensor or magnetometer, an acceleration sensor or accelerometer, a grip sensor, a proximity sensor, a color sensor (such as a red green blue (RGB) sensor), a bio-physical sensor, a temperature sensor, a humidity sensor, an illumination sensor, an ultraviolet (UV) sensor, an electromyography (EMG) sensor, an elec-troencephalogram (EEG) sensor, an electrocardiogram (ECG) sensor, an infrared (IR) sensor, an ultrasound sensor, an iris sensor, or a fingerprint sensor. Moreover, the sensor(s) 180 can include one or more position sensors, such as an inertial measurement unit that can include one or more accelerometers, gyroscopes, and other components. In addi-tion, the sensor(s) 180 can include a control circuit for controlling at least one of the sensors included here. Any of these sensor(s) 180 can be located within the electronic device 101.

In some embodiments, the electronic device 101 can be a wearable device or an electronic device-mountable wearable device (such as an HMD). For example, the electronic device 101 may represent an XR wearable device, such as a headset or smart eyeglasses. In other embodiments, the first external electronic device 102 or the second external elec-tronic device 104 can be a wearable device or an electronic device-mountable wearable device (such as an HMD). In those other embodiments, when the electronic device 101 is mounted in the electronic device 102 (such as the HMD), the electronic device 101 can communicate with the electronic device 102 through the communication interface 170. The electronic device 101 can be directly connected with the electronic device 102 to communicate with the electronic device 102 without involving with a separate network.

The first and second external electronic devices 102 and 104 and the server 106 each can be a device of the same or a different type from the electronic device 101. According to certain embodiments of this disclosure, the server 106 includes a group of one or more servers. Also, according to certain embodiments of this disclosure, all or some of the operations executed on the electronic device 101 can be executed on another or multiple other electronic devices (such as the electronic devices 102 and 104 or server 106). Further, according to certain embodiments of this disclosure, when the electronic device 101 should perform some func-tion or service automatically or at a request, the electronic device 101, instead of executing the function or service on its own or additionally, can request another device (such as electronic devices 102 and 104 or server 106) to perform at least some functions associated therewith. The other elec-tronic device (such as electronic devices 102 and 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server comput-ing technique may be used, for example. While FIG. 1 shows that the electronic device 101 includes the communication interface 170 to communicate with the external electronic device 104 or server 106 via the network 162 or 164, the electronic device 101 may be independently operated without a separate communication function according to some embodiments of this disclosure.

The server 106 can include the same or similar compo-nents as the electronic device 101 (or a suitable subset thereof). The server 106 can support to drive the electronic device 101 by performing at least one of operations (or functions) implemented on the electronic device 101. For example, the server 106 can include a processing module or processor that may support the processor 120 implemented in the electronic device 101. As described below, the server 106 may perform one or more functions related to efficient depth-based viewpoint matching and head pose change compensation for VST XR.

Although FIG. 1 illustrates one example of a network configuration 100 including an electronic device 101, vari-ous changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

Figure 2A:
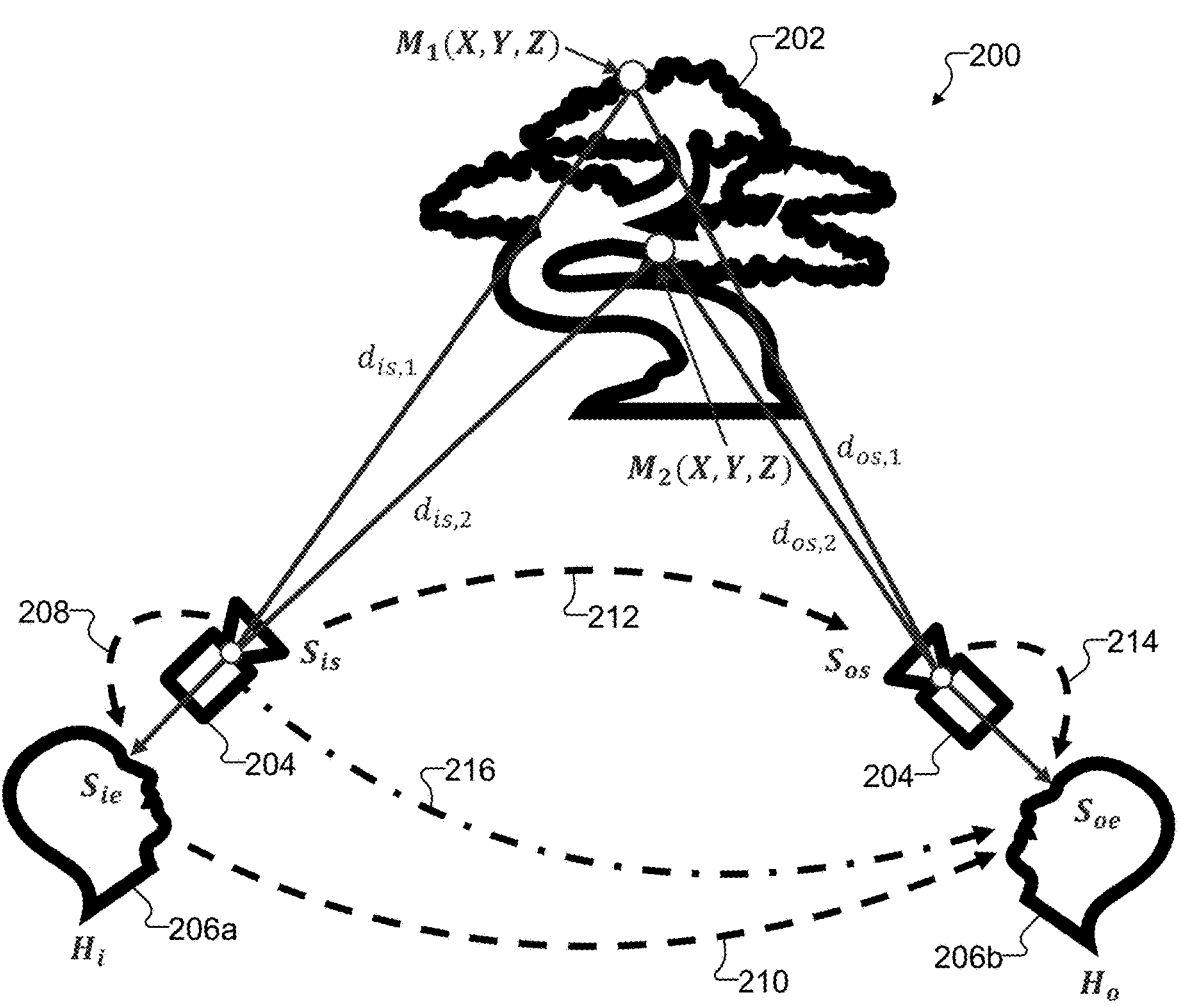
FIGS. 2A and 2B illustrate an example application for depth-based viewpoint matching and head pose change compensation for video see-through (VST) extended reality (XR) in accordance with this disclosure.
Figure 2B:
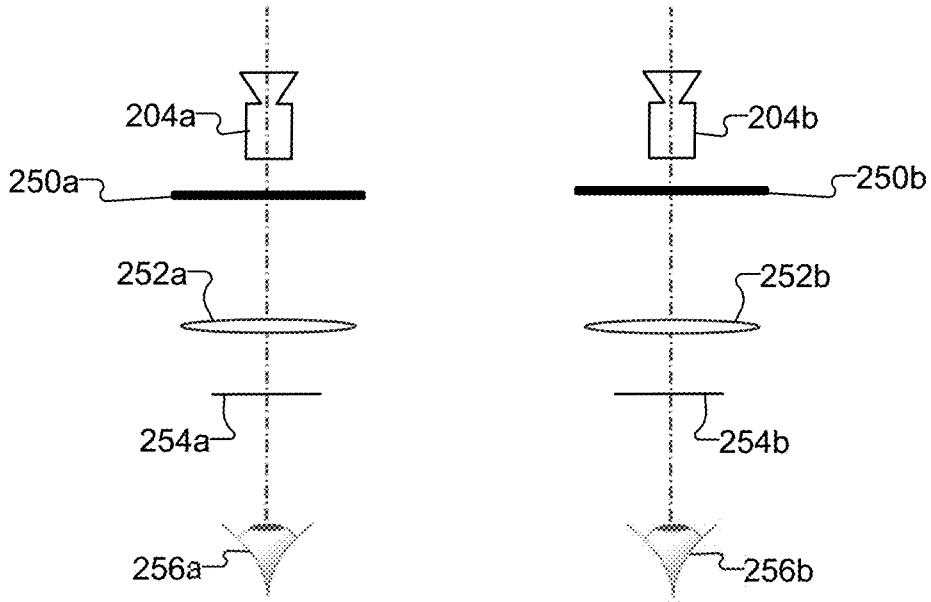

FIGS. 2A and 2B illustrate an example application 200 for depth-based viewpoint matching and head pose change compensation for VST XR in accordance with this disclo-sure. For case of explanation, the application 200 of FIG. 2 is described as involving the use of the electronic device 101 in the network configuration 100 of FIG. 1. However, the application 200 of FIG. 2 may involve the use of any other suitable device(s) and any other suitable system(s).

As shown in FIG. 2A, a 3D scene includes an object 202, which in this example represents a tree. A VST XR device (such as the electronic device 101) includes at least one see-through camera 204, such as one or more imaging sensors 180, that can be used to obtain image frames capturing the object 202 and other contents of the 3D scene. Each see-through camera 204 may often include a high-resolution color camera with a wide field-of-view (FOV) lens. A user associated with the VST XR device is shown as viewing the object 202 from multiple positions 206a-206b, where the user/VST XR device has a first head pose $H_i$ in a first position 206a and subsequently has a second head pose $H_o$ in a second position 206b. Note that the positions 206a-206b here are exaggerated in order to help illustrate certain aspects of this disclosure.

While the user has the first head pose $H_i$, image frames captured using the see-through camera 204 may be con-verted into suitable virtual image frames that can be dis-played to the user. This typically involves a transformation 208, such as a transformation supporting viewpoint match-ing $[F(S)]_{is} \rightarrow S_{ie}$) between the see-through camera's view-point $S_{is}$ and the user's eye viewpoint $S_{ie}$ and parallax correction $[F(S)]_{is} \rightarrow S_{ie}$) from the see-through camera 204 to the virtual camera (the user's eye) in the position 206a. If the user's head pose changes or is predicted to change from the first head pose $H_i$ to the second head pose $H_o$, in order to reduce the need to capture and process new image frames at the position 206b, a transformation 210 may be performed that involves pose change compensation $F(H_i \rightarrow H_o)$ from the original head pose $H_i$ to the new head pose $H_o$. Alternatively, a transformation 212 may be performed that involves pose change compensation $[F(S)]_{is} \rightarrow S_{os}$) from the original head pose $H_i$ to the new head pose $H_o$. This is followed by a transformation 214, such as a transformation supporting viewpoint matching $[\![F(S)]\!]_{os} \rightarrow S_{oe})$ between the see-through camera's viewpoint $S_{os}$ and the user's eye viewpoint $S_{oe}$ and parallax correction $[\![F(S)]\!]_{os} \rightarrow S_{oe})$ from the see-through camera 204 to the virtual camera in the position 206b.

In either case, virtual image frames of the 3D scene, including the object 202, can be generated for presentation while the user is in the first position 206a or the second position 206b. Note here that various operations are depth-based and rely on the fact that different points within the 3D scene, such as points $M_1$ and $M_2$ of the object 202, have different depths within the 3D scene. For instance, the point $M_1$ can have a depth $d_{is,1}$ when the user is in the first position 206a and a depth $d_{os,1}$ when the user is in the second position 206b, and the point $M_2$ can have a depth $d_{is,2}$ when the user is in the first position 206a and a depth $d_{os,2}$ when the user is in the second position 206b. Depending on how the user's head pose changes, the depth $d_{is,1}$ may or may not equal the depth $d_{os,1}$, and the depth $d_{is,2}$ may or may not equal the depth $d_{os,2}$. For instance, the user's head pose may change in various ways, such as by moving or translating along at least one of three orthogonal axes x, y, and z and/or rotating about at least one of the three orthogonal axes x, y, and z. Rotation generally does not change depths within the 3D scene, while translation may change depths within the 3D scene.

Prior approaches have generally performed the transformations 208-210 or the transformations 212-214 sequentially, which can require a lot of computational resources and result in longer latencies (particularly due to the depth-based nature of many of these transformations). The techniques of this disclosure described below support the use of a single transformation 216, which can be used to convert see-through image frames captured using the see-through camera 204 in the head pose $H_i$ into corresponding virtual image frames that are presented to the user in the head pose $H_o$. The transformation 216 represents a depth-based transformation that can be used to generate image frames at the user's eye viewpoint $S_{oe}$ from see-through image frames captured at the see-through camera's viewpoint $S_{is}$. This is therefore a direct transformation that can reduce computational resources and reduce latencies. Note that this transformation 216 can be used when the user's head pose actually changes or is predicted to change between the head pose $H_i$ to the head pose $H_o$. Moreover, different operations for converting see-through image frames into virtual image frames can be used selectively based on the circumstances, such as when the transformation 216 is used in the presence of translation or translation and rotation of the VST XR device when moving between the head poses $H_i$ and $H_o$. In other situations, for instance, the VST XR device may perform planar reprojection when only rotation occurs when moving between the head poses $H_i$ and $H_o$, or no transformation may be needed when no movement (or no significant amount of movement) of the VST XR device occurs. This can help to further reduce computational resources and reduce latencies.

As shown in FIG. 2B, some embodiments of the VST XR device can include left and right see-through cameras 204a-204b, which can be used to capture images of 3D scenes. The see-through cameras 204a-204b may, for example, represent different imaging sensors 180 of the electronic device 101. Each of the see-through cameras 204a-204b can be used to capture see-through image frames, which represent images that capture a 3D scene from the perspective of that see-through camera 204a-204b.

The see-through image frames can be used to generate image frames that are presented on left and right display panels 250a-250b of the VST XR device. The display panels 250a-250b may, for example, represent one or more displays 160 of the electronic device 101. In some cases, the display panels 250a-250b may represent separate displays 160. In other cases, the display panels 250a-250b may represent different portions of the same display 160. The image frames presented on the display panels 250a-250b are focused using left and right display lenses 252a-252b, which can represent convex-convex lenses or other suitable lenses used in the VST XR device. The displayed image frames are used to create left and right virtual image frames 254a-254b, which can be viewed by left and right eyes 256a-256b of a user.

The approach shown in FIG. 2A can be repeated multiple times in order to process see-through image frames captured using the see-through cameras 204a-204b. Thus, for instance, a suitable transformation 216 may be applied to image frames captured using the see-through camera 204a for presentation on the display panel 250a as the user's head pose changes or is predicted to change. Similarly, a suitable transformation 216 may be applied to image frames captured using the see-through camera 204b for presentation on the display panel 250b as the user's head pose changes or is predicted to change. Note that the transformation 216 that modifies image frames captured using the see-through camera 204a need not be identical to the transformation 216 that modifies image frames captured using the see-through camera 204b.

Although FIGS. 2A and 2B illustrate one example of an application 200 for depth-based viewpoint matching and head pose change compensation for VST XR, various changes may be made to FIGS. 2A and 2B. For example, a VST XR device may be used in any suitable environment and may be subject to any number of head pose changes. The example shown in FIG. 2A is merely meant to illustrate one example situation in which a direct transformation between see-through image frames at one head pose and virtual image frames at another head pose may be used. Also, the arrangement of components shown in FIG. 2B is for illustration only and can easily vary as needed or desired.

Figure 3:
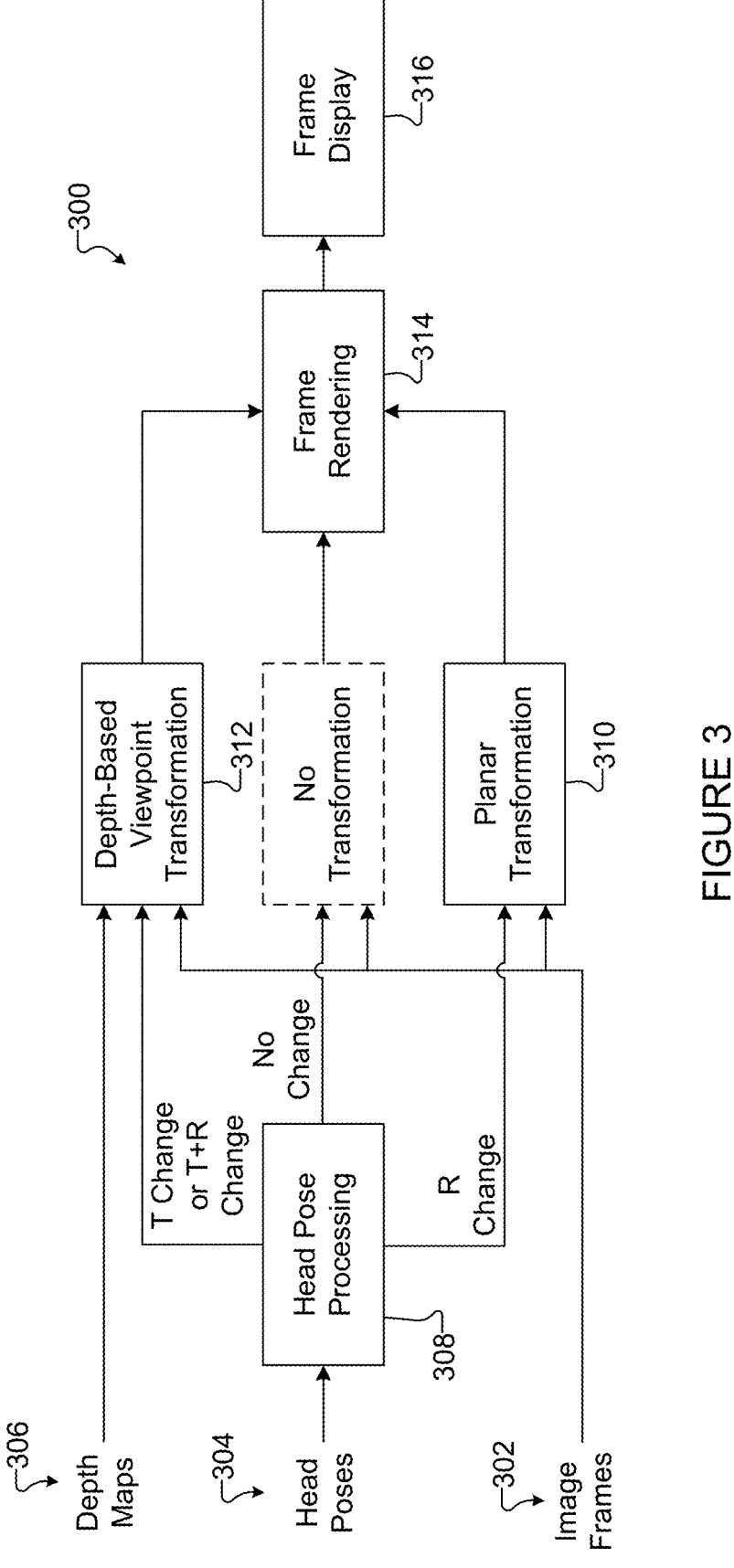
FIG. 3 illustrates an example architecture supporting depth-based viewpoint matching and head pose change compensation for VST XR in accordance with this disclosure.

FIG. 3 illustrates an example architecture 300 supporting depth-based viewpoint matching and head pose change compensation for VST XR in accordance with this disclosure. For ease of explanation, the architecture 300 of FIG. 3 is described as being implemented using the electronic device 101 in the network configuration 100 of FIG. 1. However, the architecture 300 of FIG. 3 may be implemented using any other suitable device(s) and in any other suitable system(s).

As shown in FIG. 3, the architecture 300 receives and processes see-through image frames 302, head poses 304, and depth maps 306. Each see-through image frame 302 represents an image frame captured using a see-through camera 204, 204a-204b of a VST XR device. Each see-through image frame 302 can have any suitable size, shape, and resolution and include image data in any suitable domain. As particular examples, each see-through image frame 302 may include RGB image data, YUV image data, or Bayer or other raw image data.

Each head pose 304 represents information defining or related to a head pose associated with the VST XR device. In some cases, a head pose 304 may be defined by or include six degrees of freedom, where three degrees of freedom relate to translation along three orthogonal axes and three other three degrees of freedom relate to rotation about those three orthogonal axes. Each head pose 304 may be obtained in any suitable manner, such as by using an IMU and/or a head pose tracking camera or other sensor(s) 180 of the electronic device 101.

Each depth map 306 identifies depths within a scene being captured in one or more of the see-through image frames 302. For instance, each depth map 306 may include values that identify relative or absolute depths of corresponding pixels within one or more of the see-through image frames 302. Each depth map 306 may be obtained in any suitable manner, such as by using a depth sensor or other sensor(s) 180 of the electronic device 101 or by performing depth reconstruction in which depth values in a scene are derived based on stereo images of the scene (where disparity in locations of common points in the stereo images are used to estimate depths). As a particular example, each depth map 306 may be generated by obtaining an initial depth map and increasing the resolution of the initial depth map (often referred to as "densification") using depth super-resolution and depth verification operations. In some cases, there may be any number of image frames 302 to be processed, and each image frame 302 can be associated with a corresponding head pose 304 and with a corresponding depth map 306.

The head poses 304 are provided to a head pose processing function 308, which generally operates to process the head poses 304 in order to detect or predict head pose changes during use of the VST XR device. For example, the head pose processing function 308 can process the information associated with the head poses 304 in order to determine if the VST XR device has been or is likely to be translated, rotated, or both. As noted above, translation generally refers to movement along one or more axes, such as along at least one of three orthogonal axes. Rotation generally refers to movement about one or more axes, such as about at least one of the three orthogonal axes. The head pose processing function 308 can also track head poses, such as by monitoring and recording how the head pose 304 of the user changes over time. The head pose processing function 308 can further make predictions about the user's head pose, such as by predicting (based on prior and current head poses 304) what a future head pose 304 of the user is likely to be. The head pose processing function 308 can generate suitable outputs here to indicate (among other things) the extents to which translational and/or rotational movements of the head poses 304 have been detected or are predicted to occur.

In this example, when there is no change in the head pose 304 of the user (or at least no significant change in the head pose 304 of the user), the associated see-through image frame(s) 302 may undergo no transformation. In this case, the see-through image frame(s) 302 can be processed using other functions, and there may be no need to transform the image frame(s) 302 based on actual or predicted movements of the VST XR device. This situation may occur, for instance, when the user is not moving significantly and is focusing his or her attention on a specific object in a scene.

When there is only a rotational change in the head pose 304 of the user, the associated see-through image frame(s) 302 may be processed using a planar transformation function 310. Among other things, the planar transformation function 310 can be used to rotate the see-through image frame(s) 302 based on the rotation of the VST XR device. The planar transformation function 310 here may not require any depth-based transformation since only rotating the VST XR device may not change depths between the VST XR device and objects within the 3D scene being viewed by the user.

When there is only a translational change or both translational and rotational changes in the head pose 304 of the user, the associated see-through image frame(s) 302 may be processed using a depth-based viewpoint transformation function 312. As described in more detail below, the depth-based viewpoint transformation function 312 can be used to perform a single transformation to provide viewpoint matching, parallax correction, and head pose change compensation. Using the example of FIG. 2A, for instance, the depth-based viewpoint transformation function 312 can be used to implement the transformation 216 in order to generate virtual image frames at the user's eye viewpoint $S_{oe}$ from see-through image frames captured at a see-through camera's viewpoint $S_{is}$. This can also be done to generate virtual image frames at multiple eye viewpoints based on see-through image frames captured using multiple see-through cameras 204a-204b. Details of example implementations of the depth-based viewpoint transformation function 312 are provided below.

A frame rendering function 314 generally operates to render the image frames provided by the head pose processing function 308 (in cases where no transformation is applied), from the planar transformation function 310, or from the depth-based viewpoint transformation function 312. For example, the frame rendering function 314 may generate final images of a scene that can be presented to a user. In some cases, the frame rendering function 314 may include or be used in conjunction with display lens distortion and chromatic aberration correction operations that can reduce or minimize the effects of display lens distortion and chromatic aberration (which may be caused by display lenses 252a-252b used to focus displayed images onto the user's eyes). A frame display function 316 generally operates to present the rendered image frames to the user, such as on one or more display panels 250a-250b. The displayed images are used to create left and right virtual image frames, which can be viewed by the left and right eyes of the user.

Figure 4:
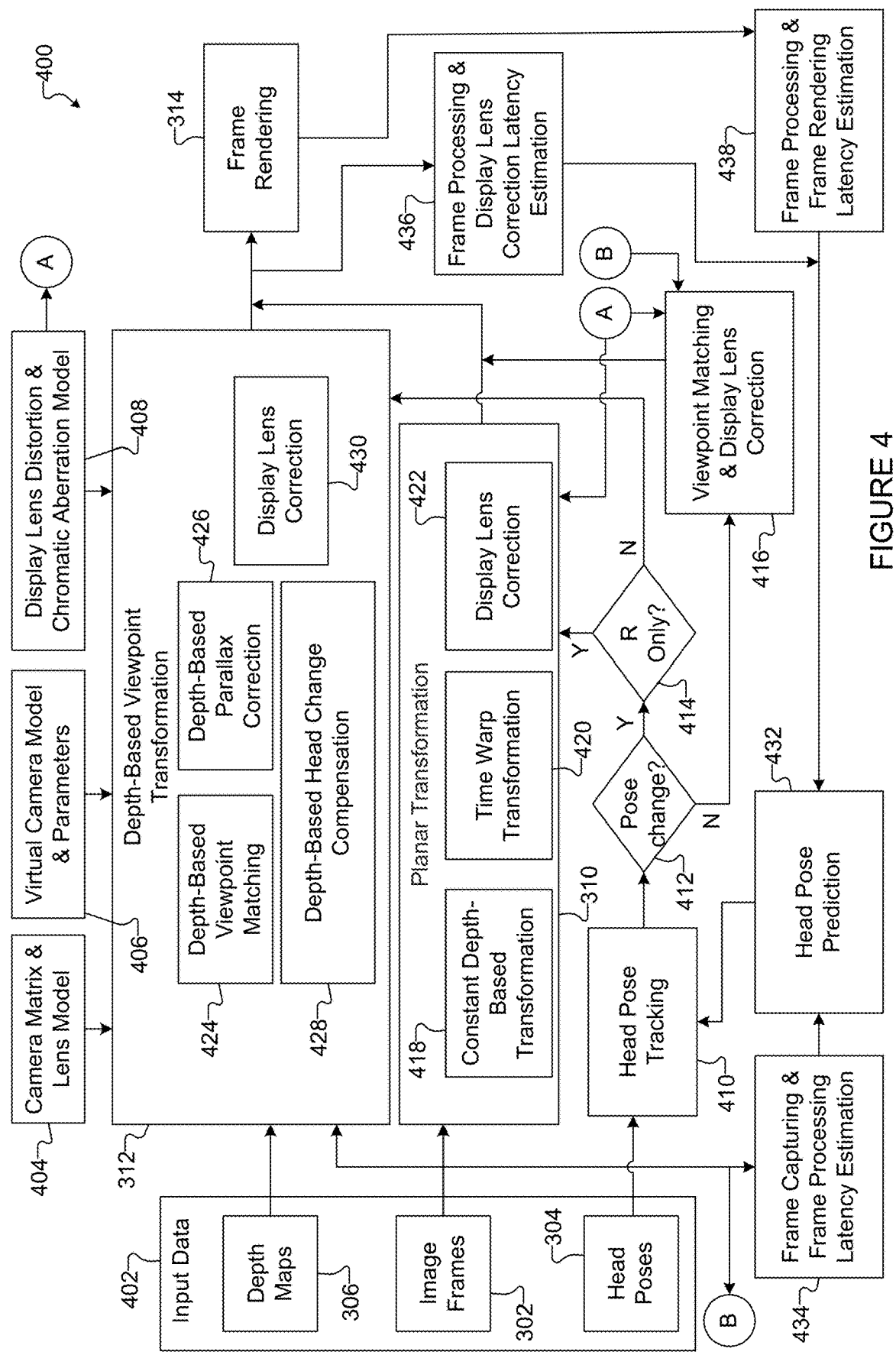
FIG. 4 illustrates a more-specific example architecture supporting depth-based viewpoint matching and head pose change compensation for VST XR in accordance with this disclosure.

FIG. 4 illustrates a more-specific example architecture 400 supporting depth-based viewpoint matching and head pose change compensation for VST XR in accordance with this disclosure. More particularly, the architecture 400 of FIG. 4 represents a specific implementation of the architecture 300 of FIG. 3, where example implementations of certain functions from FIG. 3 are shown in more detail in FIG. 4. For ease of explanation, the architecture 400 of FIG. 4 is described as being implemented using the electronic device 101 in the network configuration 100 of FIG. 1. However, the architecture 400 of FIG. 4 may be implemented using any other suitable device(s) and in any other suitable system(s).

As shown in FIG. 4, the architecture 400 receives and processes input data 402, which in this example includes the see-through image frames 302, head poses 304, and depth maps 306. Note that in the following discussion, the architecture 400 may be described as being used to process image frames 302 captured using one see-through camera 204. However, the architecture 400 can easily process image frames 302 captured using multiple see-through cameras, such as left and right see-through cameras 204a-204b. Similarly, while the architecture 400 may be described as being used to present rendered image frames on a display panel 250a or 250b for viewing, the architecture 400 can easily present rendered image frames on multiple display panels 250a-250b for viewing.

The architecture 400 also receives and uses at least one camera matrix and lens model 404, one or more virtual camera models and parameters 406, and one or more display lens distortion and chromatic aberration models 408. Each camera matrix and lens model 404 can include a camera matrix associated with a see-through camera 204 and a model of a lens used with that see-through camera 204, which in some cases may be obtained during calibration of a VST XR device. A camera matrix is often defined as a three-by-three matrix that includes two focal lengths in the x and y directions and the principal point of the camera defined using x and y coordinates. A lens model is often defined as a mathematical model that indicates how scenes can be distorted when passing through the lens of a see-through camera 204, which can be derived based on the specific lens or other optical component(s) being used and which can be used to subsequently "undistort" captured image frames.

Each of the virtual camera models and parameters 406 can include a mathematical model and associated parameters that define the view to be generated for an associated virtual camera. A virtual camera represents an artificial camera that is assumed to exist at the location of a user's eye, and virtual image frames represent artificially-created image frames that would be captured by one or more virtual cameras at one or more locations of the user's eye(s). Each of the virtual camera models and parameters 406 can therefore be used to determine how virtual image frames can be generated so as to appear as if they are captured by an associated virtual camera at the location of the user's eye.

The one or more display lens distortion and chromatic aberration models 408 can include one or more mathematical models associated with one or more display lenses 252a-252b, which can be used to focus image frames displayed on one or more display panels 250a-250b of the VST XR device onto the user's eyes. For example, light passing through each display lens 252a-252b can be distorted geometrically due to the lens itself and can suffer from chromatic aberration, and the display lens distortion and chromatic aberration model(s) 408 can identify these distortions and chromatic aberrations. The one or more display lens distortion and chromatic aberration models 408 can be used to subsequently pre-distort image frames to be displayed so that the displayed image frames (when actually viewed by the user) have little or no lens distortions and chromatic aberrations.

In this example, the head poses 304 are provided to a head pose tracking function 410, which may be included in the head pose processing function 308. The head pose tracking function 410 generally operates to track how the head pose of the user/VST XR device changes or is predicted to change as the image frames 302 are being captured, processed, and displayed. The head pose tracking function 410 can use any suitable technique to identify and track head poses, such as by processing IMU data and images captured using at least one head pose tracking camera. In some embodiments, the head pose tracking function 410 can track user head poses in six degrees of freedom (three translational and three rotational). However, in general, this disclosure is not limited to any specific technique for head pose tracking.

A determination function 412 determines if the user's head pose has changed or is predicted to change, such as by at least a threshold amount or percentage. For instance, the determination function 412 may compare the user's current head pose to one or more earlier head poses or compare the user's predicted head pose to the current head pose or one or more earlier head poses in order to determine if the user's head pose has changed or is predicted to change sufficiently. If so, a determination function 414 determines if the actual or predicted change in the user's head pose is rotational only. For example, the determination function 414 may analyze the outputs from the head pose tracking function 410 and determine if the change in the user's head pose involves only rotational movement or if the change in the user's head pose involves only translational movement or both translational and rotational movements.

If it is determined by the determination function 412 that no sufficient head pose change has occurred or is predicted to occur, a viewpoint matching and display lens correction function 416 can be used to process one or more of the image frames 302. The viewpoint matching and display lens correction function 416 generally operates to match the viewpoint of the see-through camera 204 that captured the one or more image frames 302 and the viewpoint of the display panel 250a or 250b to be used to present one or more rendered image frames to the user. The viewpoint matching and display lens correction function 416 also generally operates to perform a pre-distortion operation that modifies the one or more image frames 302 to account for display lens distortion and chromatic aberration. The corrected image frame(s) 302 can be provided to the frame rendering function 314, which can render the corrected image frame(s) 302 for presentation to the user.

If it is determined by the determination function 412 that the head pose change involves only rotation of the VST XR device, the planar transformation function 310 can be used to process one or more of the image frames 302. In this example, the planar transformation function 310 includes a constant depth-based transformation function 418, a time warp transformation 420, and a display lens correction function 422. Note that while these are shown as separate functions here, it is possible to perform fewer transformations (possibly a single transformation) that accomplishes all of these functions 418-422.

The constant depth-based transformation function 418 generally operates to process one or more image frames 302 and perform a transformation of the image frame(s) 302 based on the actual or predicted rotation of the VST XR device. Thus, for instance, an image frame 302 can be rotated clockwise if the user's head pose rotates or is predicted to rotate clockwise or counter-clockwise if the user's head pose rotates or is predicted to rotate counter-clockwise. This transformation is referred to as a "constant depth-based" transformation since the head pose change here involves rotation and not translation, so depths within the scene should not change (at least to any significant extent). The time warp transformation 420 generally operates to process the one or more transformed image frames 302 and perform a transformation of the image frame(s) 302 based on the passage of time, such as based on the amount of time estimated between capture and display of the image frame(s). The display lens correction function 422 generally operates to perform a pre-distortion operation that modifies the one or more transformed image frames 302 to account for display lens distortion and chromatic aberration. The corrected image frame(s) 302 can be provided to the frame rendering function 314, which can render the corrected image frame(s) 302 for presentation to the user.

If it is determined by the determination function 412 that the head pose change involves only translation of the VST XR device or both translation and rotation of the VST XR device, the depth-based viewpoint transformation function 312 can be used to process one or more of the image frames 302. In this example, the depth-based viewpoint transformation function 312 includes a depth-based viewpoint matching function 424, a depth-based parallax correction function 426, a depth-based head change compensation function 428, and a display lens correction function 430. Note that while these are shown as separate functions here, it is possible to perform fewer transformations (possibly a single transformation) that accomplishes all of these functions 424-430.

The depth-based viewpoint matching function 424 generally operates to process one or more of the image frames 302 in order to match the viewpoint of the see-through camera 204 that captured the image frame(s) 302 and the viewpoint of the display panel 250*a* or 250*b* to be used to present one or more rendered image frames to the user. This helps to adjust the one or more image frames 302 to account for the different depths that might now exist between the 3D scene and the user. The depth-based parallax correction function 426 generally operates to adjust the one or more image frames 302 in order to correct for parallax between the position of the see-through camera 204 and the position of the associated virtual camera. The depth-based head change compensation function 428 generally operates to process the one or more image frames 302 in order to generate one or more new image frames at the user's new head pose. The display lens correction function 430 generally operates to perform a pre-distortion operation that modifies the one or more new image frames to account for display lens distortion and chromatic aberration. The corrected image frame(s) can be provided to the frame rendering function 314, which can render the corrected image frame(s) for presentation to the user.

The depth-based viewpoint transformation function 312 here effectively converts a viewpoint of the see-through camera 204 to a viewpoint of a virtual camera associated with an eye of a user while achieving a desired scaling, field-of-view, and parallax for the current head pose (view) of the user. This can be accomplished using a single transformation 216, rather than multiple (potentially complex depth-based) transformations occurring sequentially. Examples of such a transformation that can be used here are described below.

A head pose prediction function 432 can be used to predict how the user's head pose is likely to change in the future, such as based on information about the user's head movement speed and acceleration. In some cases, the movement speed and acceleration can be received as part of the information relate to the head poses 304 or derived based on that information. The head pose prediction function 432 can also predict how the user's head pose is likely to change based on estimated latencies associated with the VST XR device. For example, a frame capturing and frame processing latency estimation function 434 can be used to estimate the length of time that the VST XR device needs to capture and initially process image frames 302. A frame processing and display lens correction latency estimation function 436 can be used to estimate the length of time that the VST XR device spends processing the image frames 302 during a transformation (if any) and during display lens distortion correction and aberration correction. A frame processing and frame rendering latency estimation function 438 can be used to estimate the length of time that the VST XR device spends rendering and displaying the (possibly) transformed and corrected image frames 302. Each of these latencies can be measured in any suitable manner, such as based on calibration data determined while processing known image frames or based on estimating the length of time it takes the VST XR device to complete these operations during prior or current operations. The head pose prediction function 432 can use the total estimated latency for all operations, along with the speed and acceleration of the user's head pose movements, to estimate how the user's head pose is likely to change in the future. As a particular example, the head pose prediction function 432 can use the total estimated latency and the speed and acceleration of the user's head pose movements to estimate how the user's head pose is likely to change between capture of certain image frames 302 and display of processed/rendered versions of those same image frames 302. This information can be used by the head pose tracking function 410 to track the user's head pose, which allows the head pose tracking function 410 to determine whether the depth-based viewpoint transformation function 312 needs to be performed.

Among other things, the architectures 300 and 400 support various operations to provide efficient depth-based viewpoint matching and head pose change compensation. For example, the architectures 300 and 400 can create and implement an efficient depth-based transformation in 3D space for transforming image frames captured at see-through camera viewpoints into virtual image frames presented at eye viewpoints. When translation or translation and rotation changes occur or are predicted to occur, this can include combining viewpoint matching, parallax correction, and head pose change compensation into a single transformation in order to save computational resources and computational times. This can be useful or important for high performance of a VST XR pipeline. In some cases, display lens distortion correction and chromatic aberration correction can also be incorporated into the transformation. Moreover, the architectures 300 and 400 can dynamically create efficient transformations according to the detected or predicted head pose changes in order to transform image frames from one head pose to a new head pose more effectively. For instance, depth-based transformation can be applied when a head pose change includes translation or rotation and translation, planar reprojection can be applied when a head pose change includes only rotation, and no transformation may be needed when the head pose does not change. In addition, the architectures 300 and 400 can be used to match viewpoints between see-through cameras and a user's eyes in 3D space, where depth-based transformation can be used to create desired scaling, field-of-view, and parallax for the user.

Although FIGS. 3 and 4 illustrate examples of architectures 300 and 400 supporting depth-based viewpoint matching and head pose change compensation for VST XR, various changes may be made to FIGS. 3 and 4. For example, various components or functions in each of FIGS. 3 and 4 may be combined, further subdivided, replicated, omitted, or rearranged and additional components or functions may be added according to particular needs. Also, note that the same process described above as being performed by the architecture 300 or 400 may be repeated for any number of see-through image frames 302. For instance, the architecture 300 or 400 may be used to repeatedly process see-through image frames 302 captured using left and right see-through cameras 204*a*-204*b* for presentation of rendered images on left and right display panels or left and right portions of a display panel.

Figure 5:
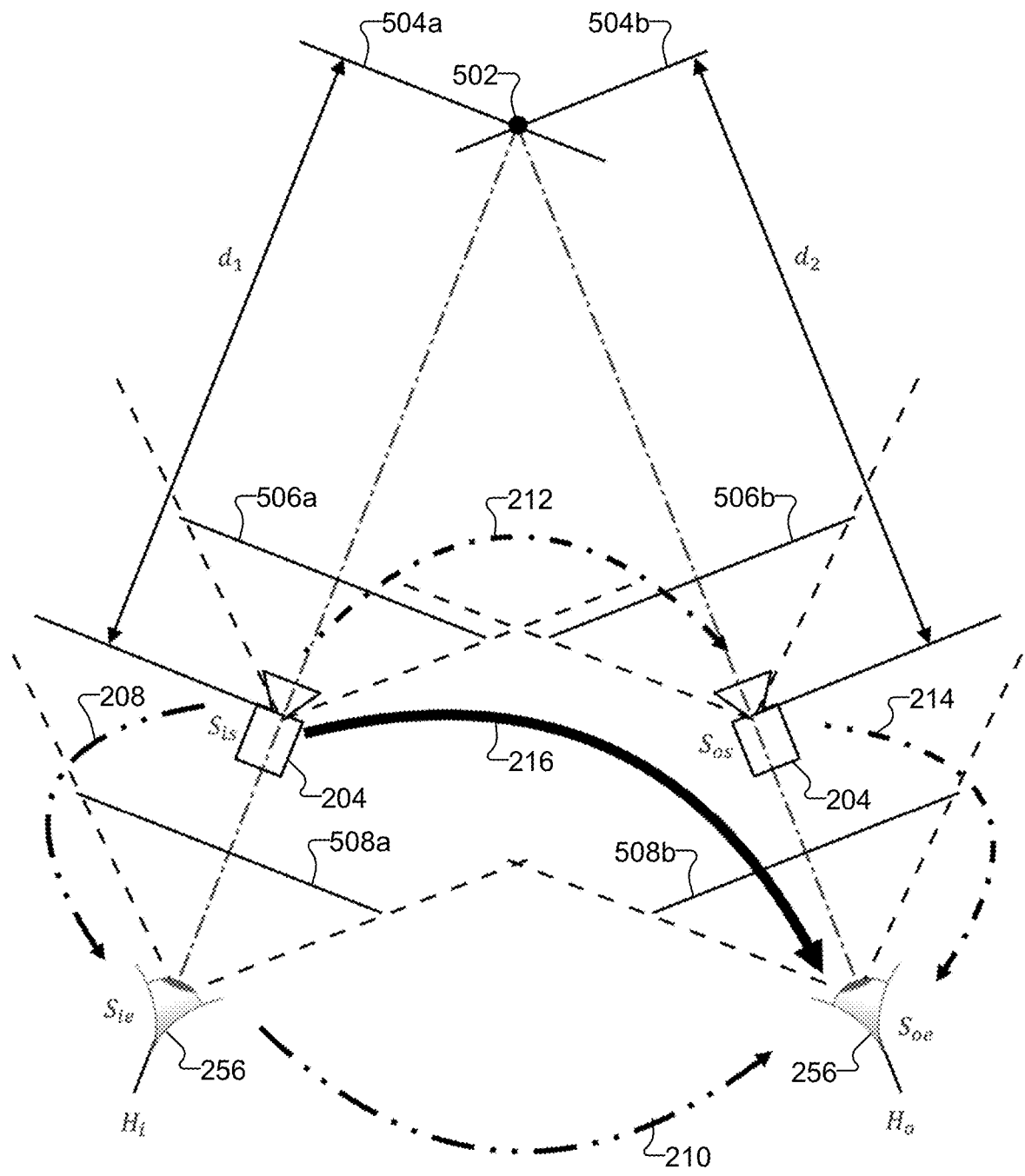
FIG. 5 illustrates example transformations supporting depth-based viewpoint matching and head pose change compensation for VST XR in accordance with this disclosure.

FIG. 5 illustrates example transformations supporting depth-based viewpoint matching and head pose change compensation for VST XR in accordance with this disclosure. For case of explanation, the transformations of FIG. 5 are described as involving the use of the electronic device 101 in the network configuration 100 of FIG. 1. However, the transformations of FIG. 5 may involve the use of any other suitable device(s) and any other suitable system(s). Note that in the following discussion, transformations may be described as being used to process image frames 302 captured using one see-through camera 204. However, transformations can easily be used to process image frames 302 captured using multiple see-through cameras, such as left and right see-through cameras 204*a*-204*b*.

As shown in FIG. 5, a user is viewing a particular point 502 in a 3D scene at different head poses $H_i$ and $H_o$, where the 3D scene is represented as a plane 504*a* in the first head pose $H_i$ and a plane 504*b* in the second head pose $H_o$. The see-through camera 204 captures image frames 506*a* at the first head pose $H_i$ and image frames 506*b* at the second head pose $H_o$. The VST XR device processes the image frames 506*a* to generate virtual image frames 508*a* in the first head pose $H_i$ and processes the image frames 506*b* to generate virtual image frames 508*b* in the second head pose $H_o$. An eye 256 of the user can view the corresponding virtual image frames 508*a*-508*b* at each head pose $H_i$ and $H_o$.

Since the VST XR device captures see-through images using see-through cameras that are not located at positions of the user's eyes, the see-through cameras and the user's eyes have different views with different parallax. Thus, the see-through image frames 506*a*-506*b* captured using the see-through camera 204 need to be transformed into the virtual image frames 508*a*-508*b* for the user's eye 256. However, during the time in which the see-through image frames 506*a*-506*b* are captured and processed and the resulting virtual image frames 508*a*-508*b* are rendered and displayed, the user's head pose may already have changed, which means that the rendered frames may not correspond to the user's current head pose. As noted above, the transformation 216 can be used to achieve multiple effects in the VST XR device. Among other things, the transformation 216 can be used to achieve viewpoint matching and parallax correction between the viewpoint of the see-through camera 204 and the viewpoint of the user's eye 256, as well as head pose change compensation between the head pose $H_i$ at the time of image frame capture and the head pose $H_o$ at the time of image frame presentation.

Assume that the VST XR device has the first head pose $H_i$. In this head pose, the see-through camera's viewpoint $S_{is}$ may be defined as follows.

$$S\_is = [R\_is(\varphi\_is^\wedge x, \varphi\_is^\wedge y, \varphi\_is^\wedge z) + | T\_is(t\_is^\wedge x, t\_is^\wedge y, s^\wedge z)]$$

Here, $R_{is}$ represents a 4×4 rotation matrix;

$$(\varphi_{is}^x, \varphi_{is}^y, \varphi_{is}^z)$$

represent rotation angles about x, y, and z axes, respectively; $T_{is}$ represents a translation vector; and $$(t_{is}^x, t_{is}^y, t_{is}^z)$$

represent translations along the x, y, and z axes, respectively. A viewpoint $S_{ie}$ of a virtual camera at the location of the user's eye 256 in the first head pose $H_i$ may be defined as follows.

$$S\_ie = [R\_ie(\varphi\_ie^\wedge x, \varphi\_ie^\wedge y, \varphi\_ie^\wedge z) + | T\_ie(t\_ie^\wedge x, t\_ie^\wedge y, t\_ie^\wedge z)]$$

Here, $R_{ie}$ represents a 4×4 rotation matrix;

$$(\varphi_{ie}^x, \varphi_{ie}^y, \varphi_{ie}^z)$$

represent rotation angles about the x, y, and z axes, respectively; $T_{ie}$ represents a translation vector; and $$(t_{ie}^x, t_{ie}^y, t_{ie}^z)$$

represent translations along the x, y, and z axes, respectively.

Similarly, assume that the VST XR device has the second head pose $H_o$. In this head pose, the see-through camera's viewpoint $S_{os}$ may be defined as follows.

$$S\_os = [R\_os(\varphi\_os^\wedge x, \varphi\_os^\wedge y, \varphi\_os^\wedge z) + | T\_os(t\_os^\wedge x, t\_os^\wedge y, t\_os^\wedge z)]$$

Here, $R_{os}$ represents a 4×4 rotation matrix;

$$(\varphi_{os}^x, \varphi_{os}^y, \varphi_{os}^z)$$

represent rotation angles about x, y, and z axes, respectively; $T_{os}$ represents a translation vector; and $$(t_{os}^x, t_{os}^y, t_{os}^z)$$

represent translations along the x, y, and z axes, respectively. A viewpoint of a virtual camera at the location of the user's eye 256 in the second head pose $H_o$ may be defined as follows.

$$S\_oe = [R\_oe(\varphi\_oe^\wedge x, \varphi\_oe^\wedge y, \varphi\_oe^\wedge z) + | T\_oe(t\_oe^\wedge x, t\_oe^\wedge y, t\_oe^\wedge z)]$$

Here, Roe represents a 4×4 rotation matrix;

$$(\varphi_{oe}^x, \varphi_{oe}^y, \varphi_{oe}^z)$$

represent rotation angles about the x, y, and z axes, respectively; $T_{is}$ represents a translation vector; and $$(t_{oe}^x, t_{oe}^y, t_{oe}^z)$$

represent translations along the x, y, and z axes, respectively.

As noted above, the transformation 208 in the first head pose $H_i$ can involve viewpoint matching $[\![ F(S) ]\!]_{is} \rightarrow S_{ie}$) between the see-through camera's viewpoint $S_{is}$ and the user's eye viewpoint $S_{ie}$ and parallax correction $[\![ F(S) ]\!]_{is} \rightarrow S_{ie}$) from the see-through camera 204 to the virtual camera. The viewpoint matching $[\![ F(S) ]\!]_{is} \rightarrow S_{ie}$) may be defined as follows.

$$\begin{pmatrix} x_{ie} \\ y_{ie} \\ z_{ie} \\ w_{ie} \end{pmatrix} = PS_{ie}S_{is}^{-1}P^{-1} \begin{pmatrix} x_{is} \\ y_{is} \\ z_{is} \\ w_{is} \end{pmatrix}$$

Here, $(x_{ie}, y_{ie}, z_{ie})^T$ represent coordinates of the virtual image frame, P represents a projection matrix, $S_{ie}$ represents the virtual camera's viewpoint, $S_{is}$ represents the see-through camera's viewpoint, and $(x_{is}, y_{is}, z_{is})$ T represent coordinates of the see-through image frame. This can be rewritten as follows.

$$M_{ie} = F_{isie}M_{is}$$

$$F_{isie} = PS_{ie}S_{is}^{-1}P^{-1}$$

$$M_{ie} = (x_{ie}, y_{ie}, z_{ie})^T$$

$$M_{is} = (x_{is}, y_{is}, z_{is})^T$$

Here, $F_{isie}$ represents depth-based viewpoint matching between the see-through camera and the virtual camera.

Similarly, as noted above, the transformation 214 in the second head pose $H_o$ can involve viewpoint matching $[F(S)]_{os} \rightarrow S_{oe})$ between the see-through camera's viewpoint $S_{is}$ and the user's eye viewpoint $S_{ie}$ and parallax correction $[F(S)]_{os} \rightarrow S_{oe})$ from the see-through camera 204 to the virtual camera. The viewpoint matching $[F(S)]_{os} \rightarrow S_{oe})$ may be defined as follows.

$$\begin{pmatrix} x_{oe} \\ y_{oe} \\ z_{oe} \\ w_{oe} \end{pmatrix} = PS_{oe}S_{os}^{-1}P^{-1} \begin{pmatrix} x_{os} \\ y_{os} \\ z_{os} \\ w_{os} \end{pmatrix}$$

Here, $(x_{oe}, y_{oe}, z_{oe})^T$ represent coordinates of the virtual image frame, P represents a projection matrix, $S_{oe}$ represents the virtual camera viewpoint, $S_{os}$ represents the see-through camera viewpoint, and $(x_{os}, y_{os}, z_{os})$ T represent coordinates of the see-through image frame. This can be rewritten as follows.

$$M_{oe} = F_{osoe}M_{os}$$

$$F_{osoe} = PS_{oe}S_{os}^{-1}P^{-1}$$

$$M_{oe} = (x_{oe}, y_{oe}, z_{oe})^T$$

$$M_{os} = (x_{os}, y_{os}, z_{os})^T$$

Here, $F_{osoe}$ represents depth-based viewpoint matching between the see-through camera and the virtual camera.

With respect to the transformation 212, this transformation occurs between the see-through camera in the head pose $H_i$ and the see-through camera in the head pose $H_o$. This transformation 212 may be defined as follows.

$$\begin{pmatrix} x_{os} \\ y_{os} \\ z_{os} \\ w_{os} \end{pmatrix} = PS_{os}S_{is}^{-1}P^{-1} \begin{pmatrix} x_{is} \\ y_{is} \\ z_{is} \\ w_{is} \end{pmatrix}$$

Here, $(x_{os}, y_{os}, z_{os})^T$ represent the coordinates of the see-through image frame in the head pose $H_o$, P represents a projection matrix, $S_{os}$ represents the see-through camera viewpoint in the head pose $H_o$, $S_{is}$ represents the see-through camera viewpoint in the head pose $H_i$, and $(x_{is}, y_{is}, z_{is})$ T represent the coordinates of the see-through image frame in the head pose $H_i$. This can be rewritten as follows.

$$M_{os} = (x_{os}, y_{os}, z_{os})$$

$$F_{isos} = PS_{os}S_{is}^{-1}P^{-1}$$

$$M_{is} = (x_{is}, y_{is}, z_{is})$$

Here, $F_{isos}$ represents the transformation of depth-based head pose changes.

Based on this, it is possible to derive the transformation 216, which can be used to convert see-through image frames captured using the see-through camera 204 in the head pose $H_i$ directly into corresponding virtual image frames that are presented to the user in the head pose $H_o$. In some cases, this transformation 216 may be expressed as follows.

$$\begin{pmatrix} x_{oe} \\ y_{oe} \\ z_{oe} \\ w_{oe} \end{pmatrix} = PS_{oe}S_{is}^{-1}P^{-1} \begin{pmatrix} x_{is} \\ y_{is} \\ z_{is} \\ w_{is} \end{pmatrix}$$

Here, $(x_{oe}, y_{oe}, z_{oe})^T$ represent coordinates of the virtual frame in the head pose $H_o$, P represents a projection matrix, $S_{oe}$ represents the virtual camera viewpoint in the head pose $H_o$, $S_{is}$ represents the see-through camera viewpoint in the head pose $H_i$, and $(x_{is}, y_{is}, z_{is})$ T represent coordinates of the see-through frame in the head pose $H_i$. This can be rewritten as follows.

$$M_{oe} = (x_{oe}, y_{oe}, z_{oe})$$

$$F_{isoe} = PS_{oe}S_{is}^{-1}P^{-1}$$

$$M_{is} = (x_{is}, y_{is}, z_{is})$$

Here, $F_{isoe}$ represents the transformation of depth-based head pose changes.

Using this type of transformation 216, the VST XR device is able to convert see-through image frames 506a-506b captured at a certain head pose to be converted directly into virtual image frames 508a-508b suitable for presentation at a different head pose. As described above, one example use case for this functionality is to account for user head pose changes that occur between capture of the see-through image frames 506a-506b and display of the virtual image frames 508a-508b. This can reduce computational loads and reduce latencies in the VST XR device, which can simplify device implementations and improve user experiences.

Although FIG. 5 illustrates one example of transformations supporting depth-based viewpoint matching and head pose change compensation for VST XR, various changes may be made to FIG. 5. For example, a VST XR device may be used in any suitable environment and may be subject to any number of head pose changes. Also, note that the same transformation 216 described above may be repeated for any number of see-through image frames 506a-506b, such as to repeatedly process see-through image frames 506a-506b captured using left and right see-through cameras 204a-204b for presentation of rendered virtual image frames 508a-508b on left and right display panels or left and right portions of a display panel.

There are a number of modifications that could potentially be made to the architectures 300 and 400 described above. The following now describes two specific modifications that can be made to the architectures 300 and 400. Note, however, that the architectures 300 and 400 may be modified in any other suitable manner.

Figures 6, 7:
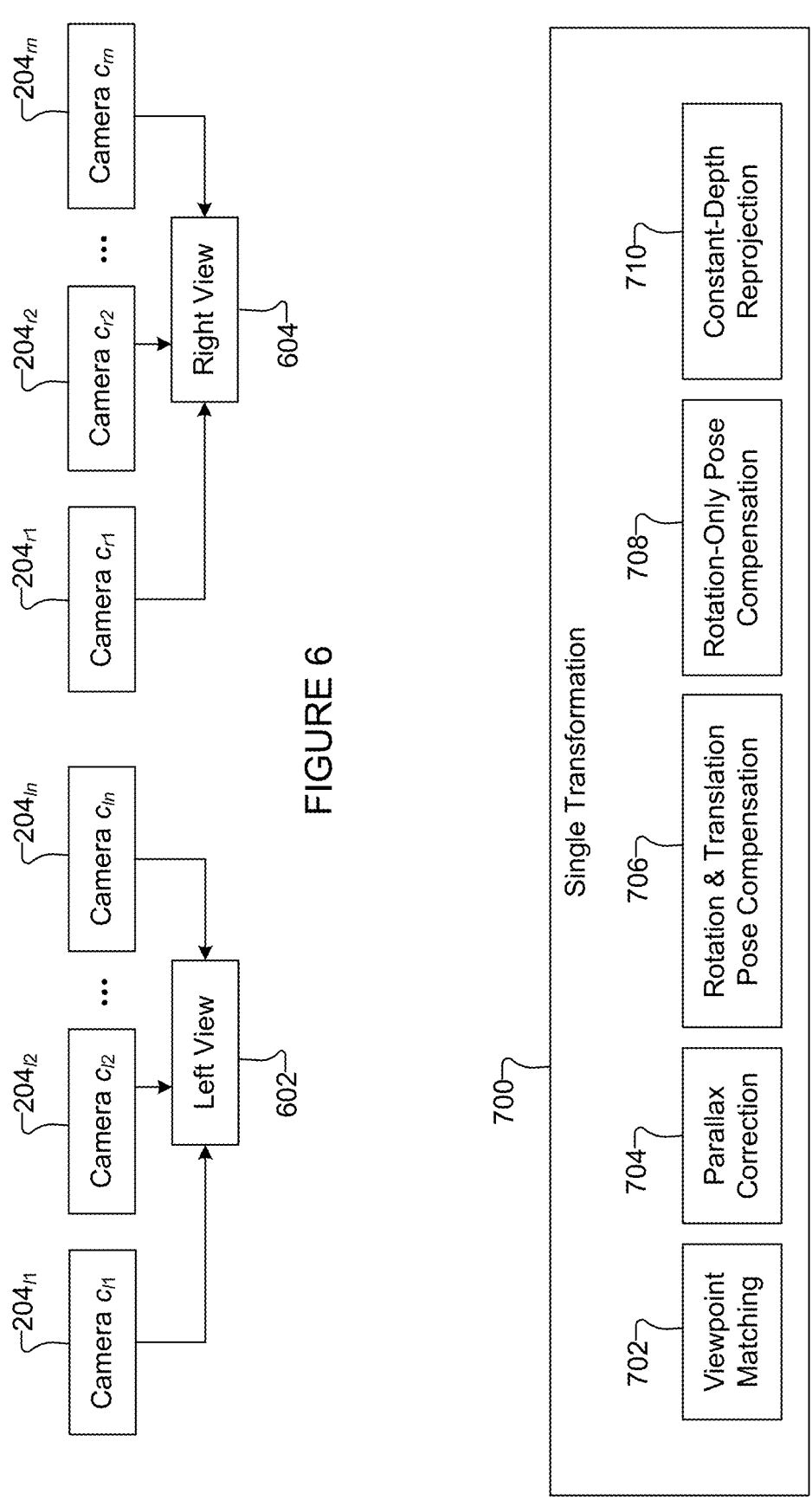
FIG. 6 illustrates an example use of multiple imaging sensors to support depth-based viewpoint matching and head pose change compensation for VST XR in accordance with this disclosure.
FIG. 7 illustrates an example transformation supporting a number of functions during depth-based viewpoint matching and head pose change compensation for VST XR in accordance with this disclosure.

FIG. 6 illustrates an example use of multiple imaging sensors to support depth-based viewpoint matching and head pose change compensation for VST XR in accordance with this disclosure. As described above with respect to FIG. 2B, a VST XR device may include a left see-through camera 204a and a right see-through camera 204b. In other embodiments, such as the one shown in FIG. 6, there may be multiple cameras $204_{l1}$-$204_{ln}$ that are used to generate a left view 602, which represents one or more virtual image frames provided to the user's left eye. There may also be multiple cameras $204_{r1}$-$204_{rm}$ that are used to generate a right view 604, which represents one or more virtual image frames provided to the user's right eye.

In these embodiments, a suitable transformation 216 may be applied to image frames captured using each camera $204_{l1}$-$204_{ln}$, and the resulting transformed image frames can be combined to generate the left view 602. Similarly, a suitable transformation 216 may be applied to image frames captured using each camera $204_{r1}$-$204_{rm}$, and the resulting transformed image frames can be combined to generate the right view 604. Note that any suitable technique may be used to combine transformed image frames, such as blending, integration, or other suitable image combination technique.

FIG. 7 illustrates an example transformation 700 supporting a number of functions during depth-based viewpoint matching and head pose change compensation for VST XR in accordance with this disclosure. As noted above, the transformation 216 provides an efficient depth-based transformation for translational or rotational and translational head pose changes, while planar reprojection may be used when only rotational head pose changes occur. This approach can provide efficient transformations for different types of head pose changes for separately improving the performance of the transformations adaptively. As shown in FIG. 7, however, it is also possible to design a transformation 700 for generating new virtual image frames from see-through image frames by combining a number of transformations, such as transformations 702-710 for viewpoint matching, parallax correction, rotation and translation pose compensation, rotation-only pose compensation, and constant-depth projection (each of which has one or more corresponding functions in FIG. 4). This type of transformation 700 may be more convenient in implementation but possibly not as efficient as the approach used in FIG. 4.

Although FIG. 6 illustrates one example use of multiple imaging sensors to support depth-based viewpoint matching and head pose change compensation for VST XR, various changes may be made to FIG. 6. For example, any suitable number of see-through cameras may be used to generate each view 602, 604. Although FIG. 7 illustrates one example of a transformation 700 supporting a number of functions during depth-based viewpoint matching and head pose change compensation for VST XR, various changes may be made to FIG. 7. For instance, the transformation 700 may include any subset of the illustrated operations and/or one or more additional operations.

In this way, the techniques described in this patent disclosure may be used to support a number of functions, applications, and use cases. For example, the described techniques support depth-based viewpoint matching, which matches the viewpoint of each see-through camera 204, 204a-204b with a viewpoint of a corresponding virtual camera (user's eye 256, 256a-256b) so that the user can obtain virtual views as if the see-through camera(s) 204, 204a-204b were installed at the user's eye position(s). The described techniques support depth-based parallax correction, which creates efficient parallax correction for the user to see a 3D scene captured by the see-through cameras 204, 204a-204b so that the user obtains correct parallax while viewing the 3D scene. The described techniques support depth-based head pose change compensation, which represents an efficient approach for compensating for head pose changes to remove or reduce delay and latency artifacts while a VST XR pipeline is generating final views and making the final views smoother. The described techniques can support other functions like depth-based frame interpolation, which can provide efficient frame interpolation to meet frame rate requirements of the VST XR pipeline so that the user obtains a real-time view steam while using the VST XR device.

Figure 8:
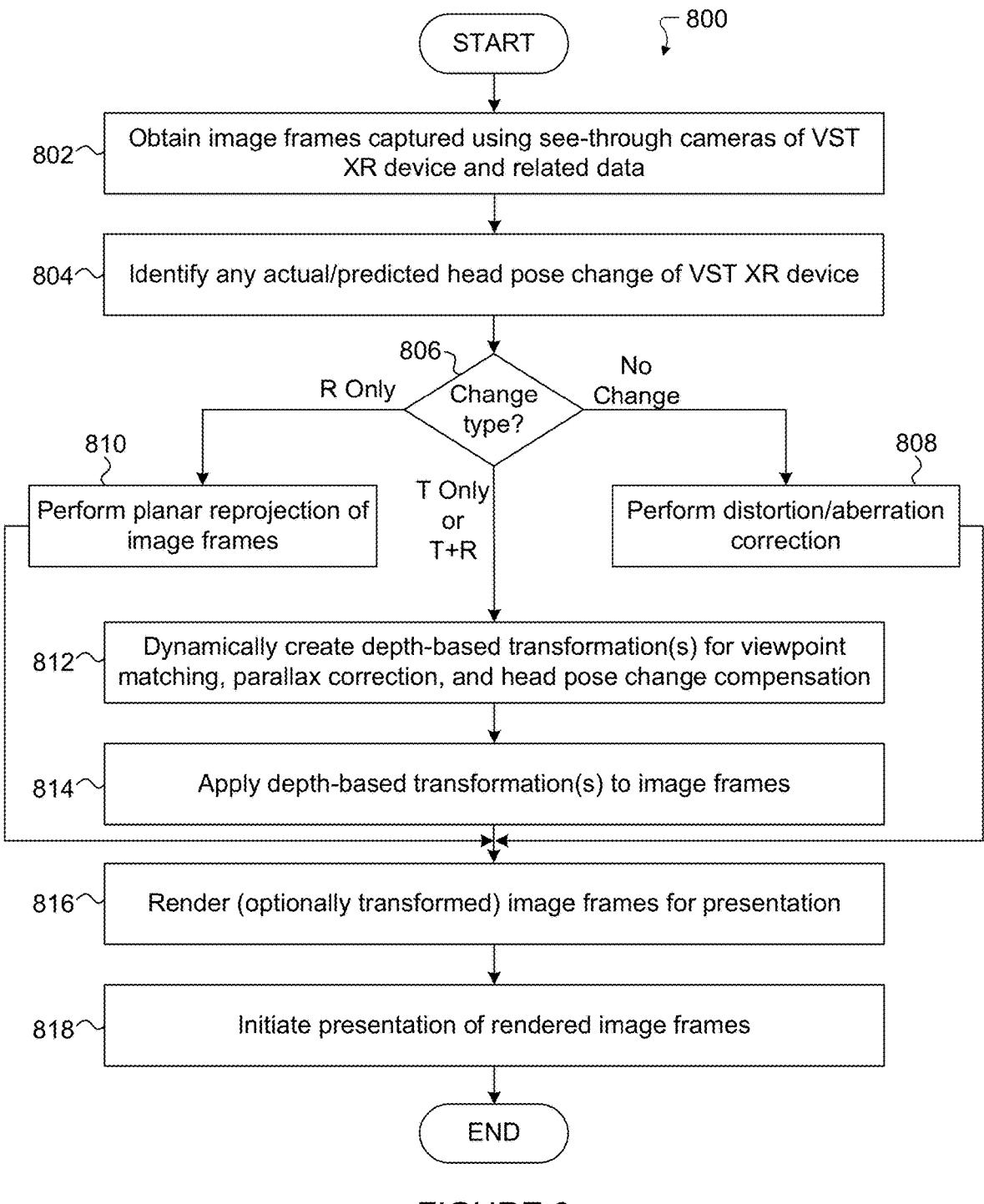
FIG. 8 illustrates an example method for depth-based viewpoint matching and head pose change compensation for VST XR in accordance with this disclosure.

FIG. 8 illustrates an example method 800 for depth-based viewpoint matching and head pose change compensation for VST XR in accordance with this disclosure. For case of explanation, the method 800 shown in FIG. 8 is described as being performed by the electronic device 101 in the network configuration 100 of FIG. 1, where the electronic device 101 can use the architecture 300 shown in FIG. 3 or the architecture 400 shown in FIG. 4. However, the method 800 shown in FIG. 8 could be performed using any other suitable device(s) and architecture(s) and in any other suitable system(s).

As shown in FIG. 8, one or more image frame captured using one or more see-through cameras of a VST XR device are obtained at step 802. This may include, for example, the processor 120 of the electronic device 101 obtaining one or more see-through image frames 302 captured using one or more see-through cameras 204, 204a-204b of the electronic device 101. In some cases, this may include obtaining one or more left see-through image frames 302 captured using the left see-through camera 204a and one or more right see-through image frames 302 captured using the right see-through camera 204b. Each see-through image frame 302 can represent a captured image of a 3D scene, such as the scene around a user/electronic device 101. Each see-through image frame 302 may optionally be pre-processed, such as by performing an undistortion operation based on the at least one camera matrix and lens model 404 in order to reduce camera lens distortion in the see-through image frame 302. As a particular example, radial or tangential distortion may be reduced or removed from each see-through image frame 302. Note that related data associated with the one or more see-through image frames 302 may also be obtained here, such as one or more head poses 304 and one or more depth maps 306.

An actual or predicted head pose change associated with the VST XR device is identified at step 804. This may include, for example, the processor 120 of the electronic device 101 analyzing any head poses 304 and any predictions of head pose changes, such as predictions generated using the head pose prediction function 432. As a particular example, this may include the processor 120 of the electronic device 101 identifying the user's head movement speed and acceleration, estimating a latency between capturing the one or more image frames 302 and presenting one or more rendered image frames, and determining if the user's head pose is expected to change by a significant amount (such as by at least a threshold amount or percentage) during the latency period based on the speed and acceleration.

A determination is made as to the type of head pose change identified (if any) at step 806. This may include, for example, the processor 120 of the electronic device 101 determining whether any identified actual or predicted head pose change is rotational (R) only, translational (T) only, translational and rotational (T+R), or none. If no change (or at least no significant change) in the user's head pose is detected or predicted, distortion and aberration correction is performed on the image frames at step 808. This may include, for example, the processor 120 of the electronic device 101 using one or more display lens distortion and chromatic aberration models 408 to correct for display lens distortions, chromatic aberrations, or other distortions and generate one or more corrected image frames.

If only a rotational change in the user's head pose is detected, planar reprojection is performed for each image frame at step 810. This may include, for example, the processor 120 of the electronic device 101 performing the planar transformation function 310 to account for the rotation (but not any translational movement) of the electronic device 101 relative to the 3D scene. This may also include the processor 120 of the electronic device 101 using the one or more display lens distortion and chromatic aberration models 408 to correct for display lens distortions, chromatic aberrations, or other distortions and generate one or more corrected image frames.

If only a translational change or both translational and rotation changes in the user's head pose are detected, at least one depth-based transformation is dynamically created at step 812. This may include, for example, the processor 120 of the electronic device 101 performing the depth-based viewpoint transformation function 312 to create at least one transformation 216 for the one or more image frames 302 based on the viewpoint of the see-through camera(s) 204, 204a-204b used to capture the see-through image frame(s) 302 and the viewpoints of the virtual camera(s) representing the user's eye(s) 256. Each dynamically-created transformation 216 provides (i) viewpoint matching between the head pose of the VST XR device when an image frame 302 is captured and the actual or predicted head pose of the VST XR device when a transformed image frame is presented, (ii) parallax correction between the head poses, and (iii) compensation for the translational or translational and rotation change(s) between the head poses. The at least one depth-based transformation is applied to the one or more image frames at step 814. This may include, for example, the processor 120 of the electronic device 101 transforming each see-through image frame 302 using its associated transformation 216. This may also include the processor 120 of the electronic device 101 using the one or more display lens distortion and chromatic aberration models 408 to correct for display lens distortions, chromatic aberrations, or other distortions and generate one or more corrected image frames.

Each corrected image frame (which may or may not have been previously transformed) can be rendered at step 816, and presentation of each rendered image frame can be initiated at step 818. This may include, for example, the processor 120 of the electronic device 101 performing the frame rendering function 314 to render the one or more corrected image frames and performing the frame display function 316 to present the one or more rendered image frames to the user, such as on one or more display panels 250a-250b. As a particular example, multiple corrected and optionally transformed image frames can be rendered and presented on the left display panel 250a associated with the left eye 256a of the user, and multiple corrected and optionally transformed image frames can be rendered and presented on the right display panel 250b associated with the right eye 256b of the user.

Although FIG. 8 illustrates one example of a method 800 for depth-based viewpoint matching and head pose change compensation for VST XR, various changes may be made to FIG. 8. For example, while shown as a series of steps, various steps in FIG. 8 may overlap, occur in parallel, occur in a different order, or occur any number of times (including zero times).

It should be noted that the functions shown in or described with respect to FIGS. 2A through 8 can be implemented in an electronic device 101, 102, 104, server 106, or other device(s) in any suitable manner. For example, in some embodiments, at least some of the functions shown in or described with respect to FIGS. 2A through 8 can be implemented or supported using one or more software applications or other software instructions that are executed by the processor 120 of the electronic device 101, 102, 104, server 106, or other device(s). In other embodiments, at least some of the functions shown in or described with respect to FIGS. 2A through 8 can be implemented or supported using dedicated hardware components. In general, the functions shown in or described with respect to FIGS. 2A through 8 can be performed using any suitable hardware or any suitable combination of hardware and software/firmware instructions. Also, the functions shown in or described with respect to FIGS. 2A through 8 can be performed by a single device or by multiple devices.

Although this disclosure has been described with example embodiments, various changes and modifications may be suggested to one skilled in the art. It is intended that this disclosure encompass such changes and modifications as fall within the scope of the appended claims.

What is claimed is:

1. A method comprising:
   obtaining, using at least one processing device of a video see-through (VST) extended reality (XR) device, an image frame of a three-dimensional (3D) scene captured using a see-through camera of the VST XR device;
   identifying, using the at least one processing device, a depth-based transformation in 3D space;
   transforming, using the at least one processing device, the image frame into a transformed image frame based on the depth-based transformation; and
   initiating, using the at least one processing device, presentation of the transformed image frame on a display panel of the VST XR device;
   wherein the depth-based transformation represents a single transformation that provides (i) viewpoint matching between a head pose of the VST XR device when the image frame is captured and a head pose of the VST XR device when the transformed image frame is presented, (ii) parallax correction between the head poses, and (iii) compensation for a change between the head poses in order to convert the image frame associated with the see-through camera directly into the transformed image frame associated with an eye of a user of the VST XR device.

2. The method of claim 1, further comprising:

determining, using the at least one processing device, whether the change between the head poses involves only translation of the VST XR device, only rotation of the VST XR device, or both translation and rotation of the VST XR device.

3. The method of claim 2, wherein:

identifying the depth-based transformation comprises dynamically creating the depth-based transformation based on the change between the head poses when the change between the head poses includes only translation of the VST XR device or both translation and rotation of the VST XR device;

the at least one processing device is configured to perform planar reprojection when the change between the head poses includes only rotation of the VST XR device; and the at least one processing device is configured to perform no transformation when there is no change in the head pose of the VST XR device.

4. The method of claim 1, wherein the depth-based transformation provides the compensation for the change between the head poses resulting from delay caused by:

a latency of capturing and processing the image frame to generate the transformed image frame;

a latency of correcting for display lens distortion and chromatic aberration; and a latency of rendering the transformed image frame for presentation.

5. The method of claim 1, wherein the depth-based transformation converts a viewpoint of the see-through camera of the VST XR device to a viewpoint of a virtual camera associated with the eye of the user of the VST XR device to achieve a desired scaling, field-of-view, and parallax for a current view of the user.

6. The method of claim 1, wherein:

the see-through camera represents a left see-through camera;

the display panel represents a left display panel; and the method further comprises:

obtaining, using the at least one processing device, a second image frame captured using a right see-through camera of the VST XR device;

identifying, using the at least one processing device, a second depth-based transformation in 3D space;

transforming, using the at least one processing device, the second image frame into a second transformed image frame based on the second depth-based transformation; and initiating, using the at least one processing device, presentation of the second transformed image frame on a right display panel of the VST XR device.

7. The method of claim 1, further comprising:

pre-processing each image frame to reduce camera lens distortion.

8. The method of claim 7, wherein the pre-processing comprises performing an undistortion operation based on at least one camera matrix and lens model.

9. The method of claim 8, wherein the undistortion operation reduces or removes radial or tangential distortion.

10. A video see-through (VST) extended reality (XR) device comprising:

a see-through camera configured to capture an image frame of a three-dimensional (3D) scene;

a display panel; and at least one processing device configured to:

obtain the image frame;

identify a depth-based transformation in 3D space;

transform the image frame into a transformed image frame based on the depth-based transformation; and initiate presentation of the transformed image frame on the display panel;

wherein the depth-based transformation represents a single transformation that provides (i) viewpoint matching between a head pose of the VST XR device when the image frame is captured and a head pose of the VST XR device when the transformed image frame is presented, (ii) parallax correction between the head poses, and (iii) compensation for a change between the head poses in order to convert the image frame associated with the see-through camera directly into the transformed image frame associated with an eye of a user of the VST XR device.

11. The VST XR device of claim 10, wherein the at least one processing device is further configured to determine whether the change between the head poses involves only translation of the VST XR device, only rotation of the VST XR device, or both translation and rotation of the VST XR device.

12. The VST XR device of claim 11, wherein:

to identify the depth-based transformation, the at least one processing device is configured to dynamically create the depth-based transformation based on the change between the head poses when the change between the head poses includes only translation of the VST XR device or both translation and rotation of the VST XR device;

the at least one processing device is configured to perform planar reprojection when the change between the head poses includes only rotation of the VST XR device; and the at least one processing device is configured to perform no transformation when there is no change in the head pose of the VST XR device.

13. The VST XR device of claim 10, wherein the depth-based transformation provides the compensation for the change between the head poses resulting from delay caused by:

a latency of capturing and processing the image frame to generate the transformed image frame;

a latency of correcting for display lens distortion and chromatic aberration; and a latency of rendering the transformed image frame for presentation.

14. The VST XR device of claim 10, wherein the at least one processing device is configured to use the depth-based transformation to convert a viewpoint of the see-through camera of the VST XR device to a viewpoint of a virtual camera associated with the eye of the user of the VST XR device to achieve a desired scaling, field-of-view, and parallax for a current view of the user.

15. The VST XR device of claim 10, wherein:

the see-through camera represents a left see-through camera;

the display panel represents a left display panel;

the VST XR device further comprises a right see-through camera and a right display panel; and the at least one processing device is further configured to:

obtain a second image frame captured using the right see-through camera;

identify a second depth-based transformation in 3D space;

transform the second image frame into a second transformed image frame based on the second depth-based transformation; and initiate presentation of the second transformed image frame on the right display panel.

16. A non-transitory machine readable medium containing instructions that when executed cause at least one processor of a video see-through (VST) extended reality (XR) device to:

obtain an image frame of a three-dimensional (3D) scene captured using a see-through camera of the VST XR device;

identify a depth-based transformation in 3D space;

transform the image frame into a transformed image frame based on the depth-based transformation; and initiate presentation of the transformed image frame on a display panel of the VST XR device;

wherein the depth-based transformation represents a single transformation that provides (i) viewpoint matching between a head pose of the VST XR device when the image frame is captured and a head pose of the VST XR device when the transformed image frame is presented, (ii) parallax correction between the head poses, and (iii) compensation for a change between the head poses in order to convert the image frame associated with the see-through camera directly into the transformed image frame associated with an eye of a user of the VST XR device.

17. The non-transitory machine readable medium of claim 16, further containing instructions that when executed cause the at least one processor to determine whether the change between the head poses involves only translation of the VST XR device, only rotation of the VST XR device, or both translation and rotation of the VST XR device;

wherein the depth-based transformation comprises a dynamically-created depth-based transformation based on the change between the head poses when the change between the head poses includes only translation of the VST XR device or both translation and rotation of the VST XR device;

wherein the instructions when executed cause the at least one processor to perform planar reprojection when the change between the head poses includes only rotation of the VST XR device; and wherein the instructions when executed cause the at least one processor to perform no transformation when there is no change in the head pose of the VST XR device.

18. The non-transitory machine readable medium of claim 16, wherein the depth-based transformation provides the compensation for the change between the head poses resulting from delay caused by:

a latency of capturing and processing the image frame to generate the transformed image frame;

a latency of correcting for display lens distortion and chromatic aberration; and a latency of rendering the transformed image frame for presentation.

19. The non-transitory machine readable medium of claim 16, wherein the depth-based transformation converts a viewpoint of the see-through camera of the VST XR device to a viewpoint of a virtual camera associated with the eye of the user of the VST XR device to achieve a desired scaling, field-of-view, and parallax for a current view of the user.

20. The non-transitory machine readable medium of claim 16, wherein:

the see-through camera represents a left see-through camera;

the display panel represents a left display panel; and the non-transitory machine readable medium further contains instructions that when executed cause the at least one processor to:

obtain a second image frame captured using a right see-through camera of the VST XR device;

identify a second depth-based transformation in 3D space;

transform the second image frame into a second transformed image frame based on the second depth-based transformation; and initiate presentation of the second transformed image frame on a right display panel of the VST XR device.

* * * * *